(12) United States Patent
Kondapaneni

(10) Patent No.: US 12,314,985 B1
(45) Date of Patent: May 27, 2025

(54) SYSTEM AND METHOD FOR EXTRACTING HINDSIGHTS FOR ASSORTMENT PLANNING

(71) Applicant: Blue Yonder Group, Inc., Scottsdale, AZ (US)

(72) Inventor: Karthik Kondapaneni, Kondapur (IN)

(73) Assignee: Blue Yonder Group, Inc., Scottsdale, AZ (US)

(*) Notice: Subject to any disclaimer, the term of this patent is extended or adjusted under 35 U.S.C. 154(b) by 97 days.

(21) Appl. No.: 17/878,798

(22) Filed: Aug. 1, 2022

Related U.S. Application Data (60) Provisional application No. 63/227,553, filed on Jul. 30, 2021.

(51) Int. Cl.
  *G06Q 30/00* (2023.01)
  *G06Q 30/0201* (2023.01)
  *G06Q 30/0282* (2023.01)

(52) U.S. Cl.
  CPC ..... *G06Q 30/0282* (2013.01); *G06Q 30/0201* (2013.01)

(58) Field of Classification Search
  CPC .................. G06Q 30/00; G06Q 10/00–50/00
  USPC ........................................................ 705/7.29
  See application file for complete search history.

(56) References Cited

U.S. PATENT DOCUMENTS

| | | | | |
|---|---|---|---|---|
| 7,433,879 | B1* | 10/2008 | Sharma | G06F 16/54 707/999.005 |
| 2011/0252031 | A1* | 10/2011 | Blumenthal | G06F 16/951 707/E17.014 |
| 2014/0149259 | A1* | 5/2014 | Grace | G06Q 30/0601 705/26.64 |
| 2014/0172502 | A1* | 6/2014 | Ryks | G06Q 30/0202 705/7.31 |
| 2016/0189177 | A1* | 6/2016 | Parpia | G06Q 30/0202 705/7.31 |
| 2017/0132683 | A1* | 5/2017 | Gunderson | G06Q 30/0621 |
| 2019/0080379 | A1* | 3/2019 | Dallahan | G06Q 30/0603 |
| 2019/0236186 | A1* | 8/2019 | Kritika | G06F 16/9536 |

OTHER PUBLICATIONS

George W. Bassel, "Functional Network Construction in *Arabidopsis* Using Rule-Based Machine Learning on Large-Scale Data Sets," The Plant Cell, vol. 23: 3101-3116, Sep. 2011.

* cited by examiner

*Primary Examiner* — Mustafa Iqbal
(74) *Attorney, Agent, or Firm* — Spencer Fane LLP; Steven J. Laureanti (57) ABSTRACT

A system and method are disclosed for extracting hindsights for assortment planning. The system provides for classifying each of one or more products in a product display area of a retail entity as high-performers or low-performers according to selected metrics. The system further provides for identifying a strength of each individual product attribute associated with each of the products, deriving a multi-combination strength of combinations of product attributes using the identified strength of each individual product attribute, and generating recommendations for product combinations based on the derived multi-combination strength of combinations of product attributes and the selected metrics.

20 Claims, 8 Drawing Sheets

SYSTEM AND METHOD FOR EXTRACTING HINDSIGHTS FOR ASSORTMENT PLANNING

CROSS REFERENCE TO RELATED APPLICATIONS

The present disclosure is related to that disclosed in the U.S. Provisional Application No. 63/227,553, filed Jul. 30, 2021, entitled "System and Method for Extracting Hindsights for Assortment Planning." U.S. Provisional Application No. 63/227,553 is assigned to the assignee of the present application. The present invention hereby claims priority under 35 U.S.C. § 119(e) to U.S. Provisional Application No. 63/227,553.

TECHNICAL FIELD

The present disclosure relates generally to data processing, and more particularly to processing data relating to retail assortment planning.

BACKGROUND

Assortment planning in a supply chain typically involves determining what products to stock in a particular retail location. Such analysis is typically based on previous sales data, in combination with the business knowledge and intuition of a supply chain planner. However, the results of such a process may be inaccurate due to inherent uncertainties in the supply chain planner's intuition. Some supply chain systems instead attempt to model demand for products at the retail location, using supply chain machine learning systems to generate one or more models to model the flow of materials and the demand for products across supply chain networks and the individual entities of the supply chain. However, systems that attempt to derive useful insights regarding the potential sales of one or more product attribute combinations using machine learning may be extremely computationally intensive and may fail to locate insights within feasible timeframes, both of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a system and method to analyze assortment planning and potential combinations of product attributes, determine hindsights and useful information from the analysis, and to recommend potential combinations of product attributes (such as, for example, preparing additional red T-shirts with a particular design logo and collar style) according to one or more selected metrics. Embodiments comprise an assortment planner that, among other actions, aggregates product-store combinations of attributes and classifies high-performing and low-performing combinations. Embodiments identify attribute strength in both single-attribute and multi-attribute contexts, and filter attributes according to attribute strengths. Embodiments utilize the attribute strengths to generate recommendations for product-store and/or product/attribute combinations based on the one or more metrics.

Embodiments of the present invention enable retailers and other supply chain entities to utilize both frequentist and Bayesian analysis techniques to conduct hindsight analysis and to identify potentially high-performing product attribute combinations in both supervised and unsupervised contexts. Embodiments search for potentially useful cross-combinations of products and attributes using computationally efficient methods and procedures, and generate directly-applicable recommendations and hindsights quickly and with reduced computational runtime requirements. Embodiments allow supply chain planners to make use of such recommendations to perform assortment planning for one or more retail locations which is based on an attribute analysis, rather than utilizing human intuition.

Figure 1:
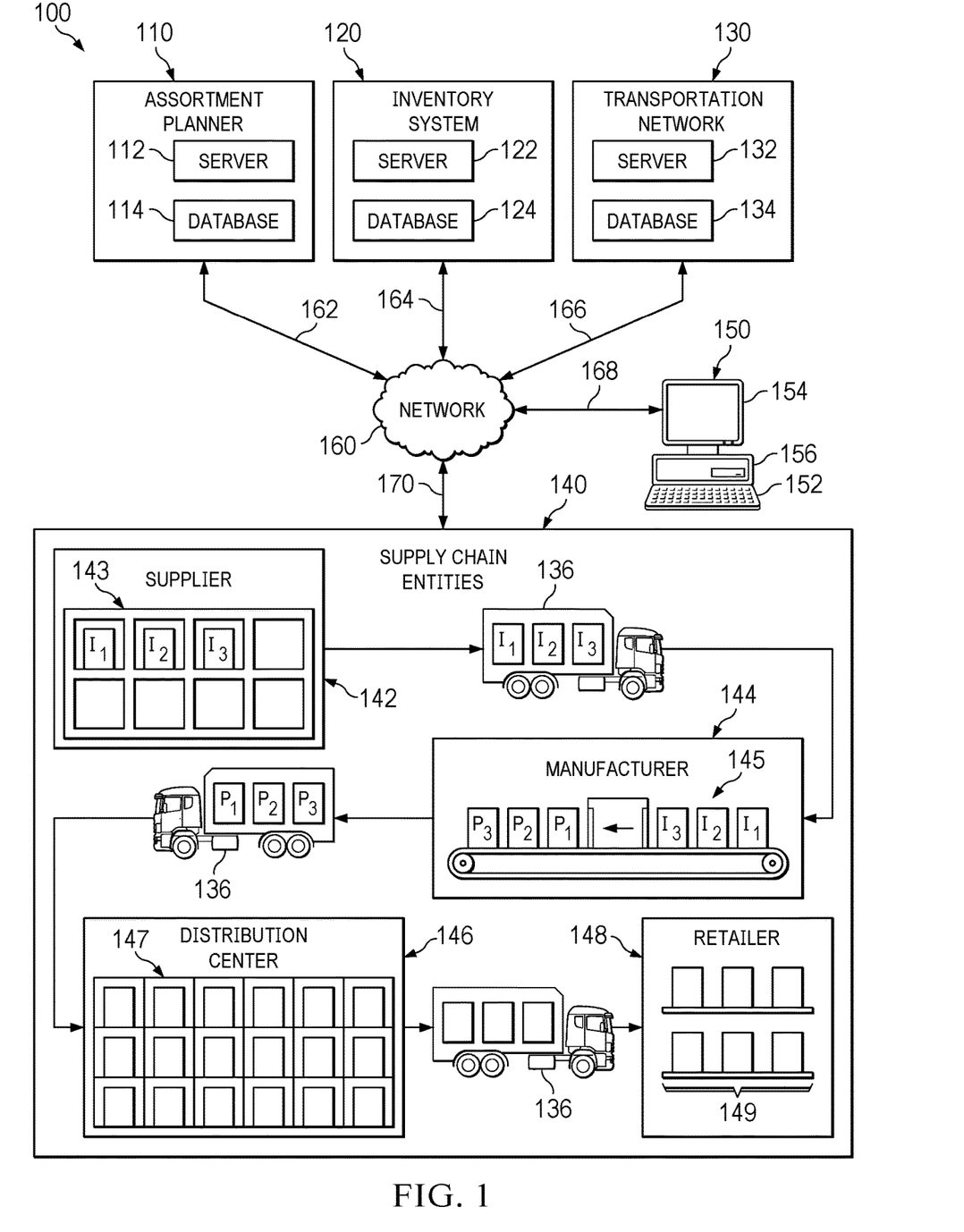
FIG. 1 illustrates an exemplary supply chain network according to a first embodiment.

FIG. 1 illustrates an exemplary supply chain network 100 according to a first embodiment. Supply chain network 100 comprises assortment planner 110, inventory system 120, transportation network 130, one or more supply chain entities 140, computer 150, network 160, and communication links 162-170. Although a single assortment planner 110, inventory system 120, transportation network 130, one or more supply chain entities 140, a single computer 150, and a single network 160 are illustrated and described, embodiments contemplate any number of assortment planners 110, inventory systems 120, transportation networks 130, supply chain entities 140, computers 150, or networks 160, according to particular needs.

In one embodiment, assortment planner 110 comprises server 112 and database 114. As described in more detail below, assortment planner 110 comprises one or more modules to, for example, generate hindsights and recommendations for product attributes based on identified attribute strength in single-attribute and multi-attribute contexts.

Inventory system 120 comprises server 122 and database 124. Server 122 is configured to receive and transmit inventory data, including item identifiers, pricing data, attribute data, inventory levels, and other like data about one or more items or products at one or more locations in supply chain network 100. Server 122 stores and retrieves inventory data from database 124 or from one or more locations in supply chain network 100.

According to embodiments, database 124 includes current or projected inventory quantities or states, order rules, or explanatory variables. For example, database 124 may comprise the current level of inventory for each item at one or more stocking points across supply chain network 100. In addition, database 124 may comprise order rules that describe one or more rules or limits on setting an inventory policy, including, but not limited to, a minimum order quantity, a maximum order quantity, a discount, and a step-size order quantity, and batch quantity rules. According to some embodiments, database 124 may comprise explanatory variables that describe the data relating to specific past, current, or future indicators and the data of promotions, seasonality, special events (such as sporting events), weather, and the like. According to some embodiments, assortment planner 110 accesses and stores inventory data in database 124, which may be used by assortment planner 110 to generate one or more planograms, set inventory levels at one or more stocking points, initiate manufacturing of one or more components, or the like. In addition, or as an alternative, the inventory data of database 124 may be updated by receiving current item quantities, mappings, or locations from inventory system 120, transportation network 130, and/or one or more supply chain entities 140.

Transportation network 130 comprises server 132 and database 134. According to embodiments, transportation network 130 directs one or more transportation vehicles 136 to ship one or more items between one or more supply chain entities 140, based, at least in part, on the planograms and instruction sets generated by assortment planner 110. Transportation vehicles 136 comprise, for example, any number of trucks, cars, vans, boats, airplanes, unmanned aerial vehicles (UAVs), cranes, robotic machinery, or the like. Transportation vehicles 136 may comprise radio, satellite, or other communication systems that communicates location information (such as, for example, geographic coordinates, distance from a location, global positioning satellite (GPS) information, or the like) with assortment planner 110, inventory system 120, transportation network 130, and/or one or more supply chain entities 140 to identify the location of transportation vehicle 136 and the location of any inventory or shipment located on transportation vehicle 136. In addition to the supply chain models, the number of items shipped by transportation vehicles 136 in transportation network 130 may also be based, at least in part, on the number of items currently in stock at one or more supply chain entities 140, the number of items currently in transit in transportation network 130, a forecasted demand, a supply chain disruption, and the like.

As shown in FIG. 1, supply chain network 100 operates on one or more computers 150 that are integral to or separate from the hardware and/or software that support assortment planner 110, inventory system 120, transportation network 130, and one or more supply chain entities 140. Supply chain network 100 comprising assortment planner 110, inventory system 120, transportation network 130, and one or more supply chain entities 140 may operate on one or more computers 150 that are integral to or separate from the hardware and/or software that support assortment planner 110, inventory system 120, transportation network 130, and one or more supply chain entities 140. One or more computers 150 may include any suitable input device 152, such as a keypad, mouse, touch screen, microphone, or other device to input information. One or more computers 150 may also include any suitable output device 154, such as, for example, a computer monitor, that may convey information associated with the operation of supply chain network 100, including digital or analog data, visual information, or audio information. Computer 150 may include fixed or removable computer-readable storage media, including a non-transitory computer readable medium, magnetic computer disks, flash drives, CD-ROM, in-memory device or other suitable media to receive output from and provide input to supply chain network 100.

Computer 150 may include one or more processors 156 and associated memory to execute instructions and manipulate information according to the operation of supply chain network 100 and any of the methods described herein. One or more processors 156 may execute an operating system program stored in memory to control the overall operation of computer 150. For example, one or more processors 156 control the reception and transmission of signals within the system. One or more processors 156 execute other processes and programs resident in memory, such as, for example, registration, identification or communication and moves data into or out of the memory, as required by an executing process. In addition, or as an alternative, embodiments contemplate executing the instructions on computer 150 that cause computer 150 to perform functions of the method. Further examples may also include articles of manufacture including tangible computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from assortment planner 110, inventory system 120, transportation network 130, and one or more supply chain entities 140. In addition, each of one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with assortment planner 110, inventory system 120, transportation network 130, and one or more supply chain entities 140.

These one or more users may include, for example, a "manager" or a "planner" handling generation of planograms and instruction sets, managing the inventory of items, imaging items, managing storage and shipment of items, and/or one or more related tasks within supply chain network 100. In addition, or as an alternative, these one or more users within supply chain network 100 may include, for example, one or more computers 150 programmed to autonomously handle, among other things, planogram planning, shelving resets, task management, communication and assignment of planograms and instructions, issue identification and resolution, controlling manufacturing equipment, and adjusting various levels of manufacturing and inventory levels at various stocking points and distribution centers 146, and/or one or more related tasks within supply chain network 100.

One or more supply chain entities 140 represent one or more supply chain network 100s, including one or more enterprises, such as, for example networks of one or more suppliers 142, manufacturers 144, distribution centers 146, retailers 148 (including brick and mortar and online stores), customers, and/or the like. Each of one or more supply chain entities 140 may comprise one or more cameras, depths sensors, infrared imaging devices, and/or other data-gathering components to capture images, depth data, and/or other data regarding one or more products and product dimensions delivered to each supply chain entity. Suppliers 142 may be any suitable entity that offers to sell or otherwise provides one or more items (i.e., materials, components, or products) to one or more manufacturers 144. Suppliers 142 may comprise automated distribution systems 143 that automatically transport products to one or more manufacturers 144 based, at least in part, on planograms and instruction sets determined by assortment planner 110 and/or one or more other factors described herein.

Manufacturers 144 may be any suitable entity that manufactures at least one product. Manufacturers 144 may use one or more items during the manufacturing process to produce any manufactured, fabricated, assembled, or otherwise processed item, material, component, good, or product. In one embodiment, a product represents an item ready to be supplied to, for example, one or more supply chain entities 140 in supply chain network 100, such as retailers 148, an item that needs further processing, or any other item. Manufacturers 144 may, for example, produce and sell a product to suppliers 142, other manufacturers 144, distribution centers 146, retailers 148, a customer, or any other suitable person or entity. Manufacturers 144 may comprise automated robotic production machinery 145 that produce products based, at least in part, on planograms and instruction sets determined by assortment planner 110 and/or one or more other factors described herein.

Distribution centers 146 may be any suitable entity that offers to store or otherwise distribute at least one product to one or more retailers 148 and/or customers. Distribution centers 146 may, for example, receive a product from a first one or more supply chain entities 140 in supply chain network 100 and store and transport the product for a second one or more supply chain entities 140. Distribution centers 146 may comprise automated warehousing systems 147 that automatically remove products from and place products into inventory based, at least in part, on one or more planograms generated by assortment planner 110.

Retailers 148 may be any suitable entity that obtains one or more products to sell to one or more customers. Retailers 148 may comprise a corporate structure having a retail headquarters and one or more retail stores. Retail headquarters comprises a central planning office with oversight of one or more retail stores. Retailer stores may comprise any online or brick-and-mortar store, including stores with shelving systems 149. The one or more retail stores may sell products according to rules, strategies, orders, and/or guidelines developed by one or more retail headquarters. For example, retail headquarters may create planograms that determine how the store will shelve or display one or more products. Although planogram execution may be performed by a retail employee, embodiments contemplate automated configuration of shelving and retail displays. This may include, for example, automated robotic shelving machinery that places products on shelves or automated shelving that automatically adjusts based, at least in part, on the planograms. Shelving systems 149 may comprise, for example, various racks, fixtures, brackets, notches, grooves, slots, or other attachment devices for fixing shelves in various configurations. These configurations may comprise shelving with adjustable lengths, heights, and other arrangements.

Although one or more supply chain entities 140 are illustrated and described as separate and distinct entities, the same entity may simultaneously act as any one of one or more supply chain entities 140. For example, one or more supply chain entities 140 acting as a manufacturer can produce a product, and the same one or more supply chain entities 140 can act as a supplier to supply an item to itself or another one or more supply chain entities 140. Although one example of supply chain network 100 is illustrated and described in FIG. 1, embodiments contemplate any configuration of supply chain network 100, without departing from the scope described herein.

In one embodiment, each of assortment planner 110, inventory system 120, transportation network 130, computer 150, and supply chain entities 140 may be coupled with network 160 using communication links 162-170, which may be any wireline, wireless, or other link suitable to support data communications between assortment planner 110 and network 160 during operation of supply chain network 100. Although communication links 162-170 are shown as generally coupling assortment planner 110, inventory system 120, transportation network 130, one or more supply chain entities 140, and computer 150 to network 160, any of assortment planner 110, inventory system 120, transportation network 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling assortment planner 110, inventory system 120, transportation network 130, one or more supply chain entities 140, and computer 150. For example, data may be maintained locally to, or externally of, assortment planner 110, inventory system 120, transportation network 130, one or more supply chain entities 140, and computer 150 and made available to one or more associated users of assortment planner 110, inventory system 120, transportation network 130, one or more supply chain entities 140, and computer 150 using network 160 or in any other appropriate manner. For example, data may be maintained in a cloud database at one or more locations external to assortment planner 110, inventory system 120, transportation network 130, one or more supply chain entities 140, and computer 150 and made available to one or more associated users of assortment planner 110, inventory system 120, transportation network 130, one or more supply chain entities 140, and computer 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

In accordance with the principles of embodiments described herein, assortment planner 110 may generate planograms and instruction sets for the inventory of one or more supply chain entities 140 in supply chain network 100. Furthermore, assortment planner 110, inventory system 120, and/or transportation network 130 may instruct automated machinery (i.e., robotic warehouse systems, robotic inventory systems, automated guided vehicles, mobile racking units, automated robotic production machinery 145, robotic devices and the like) to adjust product mix ratios, inventory levels at various stocking points, production of products of manufacturing equipment, proportional or alternative sourcing of one or more supply chain entities 140, the configuration and quantity of packaging and shipping of products, and the display of products at one or more retail locations based on one or more planograms and instruction sets, generated plans and policies and/or current inventory or production levels. When the inventory of an item falls to a reorder point, assortment planner 110 may then automatically adjust product mix ratios, inventory levels, production of products of manufacturing equipment, and proportional or alternative sourcing of one or more supply chain entities 140 until the inventory is resupplied to a target quantity.

For example, the methods described herein may include computers 150 receiving product data from automated machinery having at least one sensor and the product data corresponding to an item detected by the sensor of the automated machinery. The received product data may include an image of the item, an identifier, as described above, and/or other product data associated with the item (dimensions, texture, estimated weight, and any other like data). The method may further include computers 150 looking up the received product data in database system associated with assortment planner 110, inventory system 120, and/or transportation network 130 to identify the item corresponding to the product data received from the automated machinery.

Computers 150 may also receive, from the automated machinery, a current location of the identified item. Based on the identification of the item, computers 150 may also identify (or alternatively generate) a first mapping in database system, where the first mapping is associated with the current location of the item. Computers 150 may also identify a second mapping in database system, where the second mapping is associated with a past location of the identified item. Computers 150 may also compare the first mapping and the second mapping to determine if the current location of the identified item in the first mapping is different than the past location of the identified item in the second mapping. Computers 150 may then send instructions to the automated machinery based, as least in part, on one or more differences between the first mapping and the second mapping such as, for example, to locate an item to add to or remove from a shelf or an inventory of or shipment for one or more supply chain entities 140. In addition, or as an alternative, assortment planner 110 monitors the supply chain constraints of one or more items at one or more supply chain entities 140 and adjusts the orders and/or inventory of one or more supply chain entities 140 based on the supply chain constraints.

Figure 2:
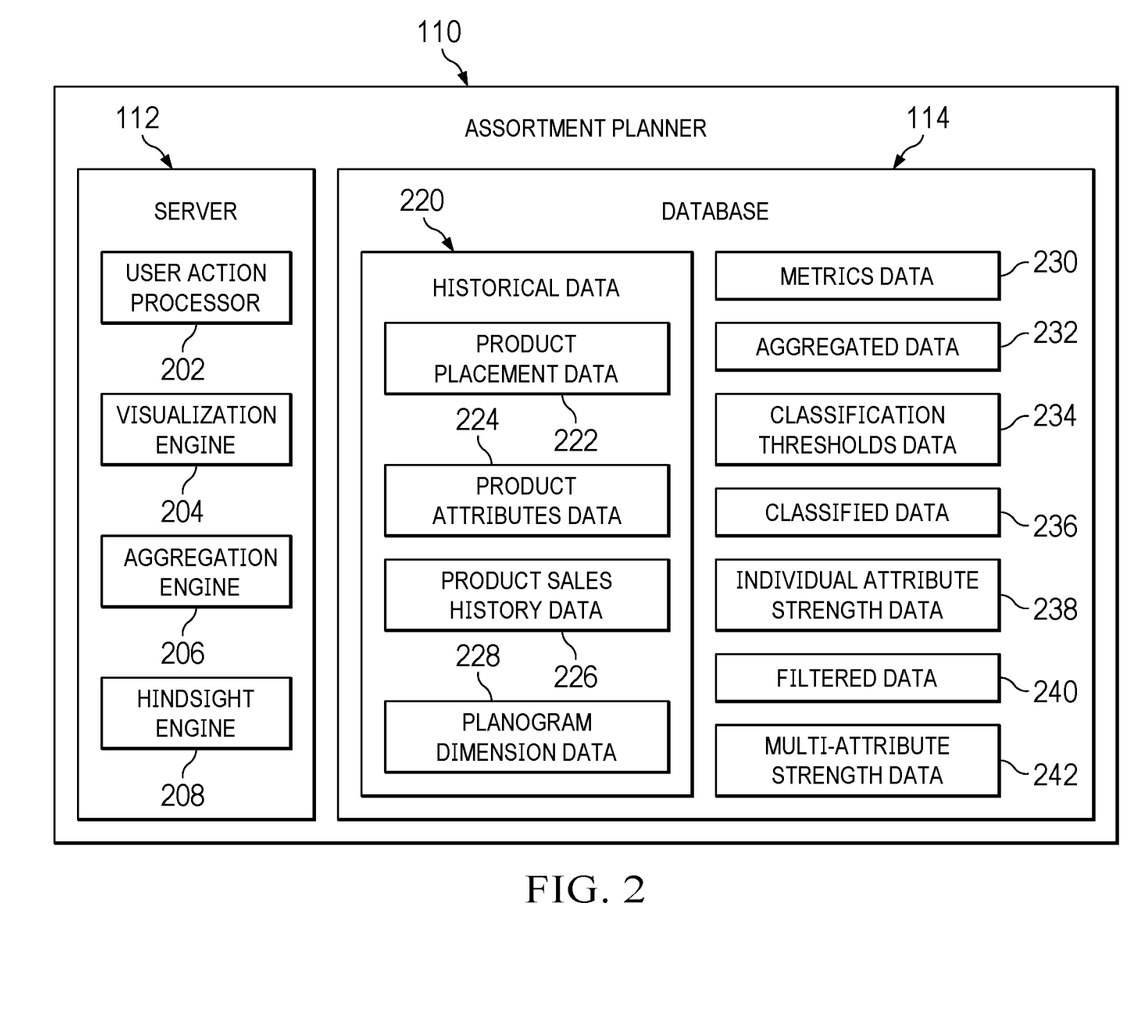
FIG. 2 illustrates the assortment planner of FIG. 1 in greater detail in accordance with an embodiment.

FIG. 2 illustrates assortment planner 110 of FIG. 1 in greater detail in accordance with an embodiment. As discussed above, assortment planner 110 may comprise one or more computers 150 at one or more locations including associated input devices 152, output devices 154, non-transitory computer-readable storage media, processors 156, memory, or other components for receiving, processing, storing, and communicating information according to the operation of supply chain network 100. Additionally, assortment planner 110 comprises server 112 and database 114. Although assortment planner 110 is shown as comprising a single server 112 and a single database 114, embodiments contemplate any suitable number of computers 150, servers 112, or databases 114 internal to or externally coupled with assortment planner 110. According to some embodiments, assortment planner 110 may be located internal to one or more retailers 148 of one or more supply chain entities 140. In other embodiments, assortment planner 110 may be located external to one or more retailers 148 of one or more supply chain entities 140 and may be located in for example, a corporate retailer of the one or more retailers 148, according to particular needs.

Server 112 may comprise user action processor 202, visualization engine 204, aggregation engine 206, and hindsight engine 208. Although server 112 is illustrated and described as comprising a single user action processor 202, visualization engine 204, aggregation engine 206, and hindsight engine 208, embodiments contemplate any suitable number or combination of these located at one or more locations, local to, or remote from assortment planner 110, such as on multiple servers 112 or computers 150 at any location in supply chain network 100.

User action processor 202 may receive and process user input, such as, for example, input received by input device 152 of one or more computers 150, including but not limited to a keyboard or mouse. One or more computers 150 may transmit input to assortment planner 110 using one or more communication links 162-170. User action processor 202 may register the input from one or more computers 150 and transmit the input to visualization engine 204 and/or other assortment planner 110 modules to instigate or control module functions.

Visualization engine 204 generates one or more graphical user interface (GUI) displays for display on one or more computer monitors and/or other output devices 154. According to embodiments, visualization engine 204 may access database 114, including but not limited to historical data 220, product attributes data 222, product sales history data 224, planogram dimension data 228, metrics data 230, aggregated data 232, classification thresholds data 234, classified data 236, individual attribute strength data 238, filtered data 240, and multi-attribute strength data 242, and may generate or more graphical user interface displays to display the data. The one or more graphical user interface displays may convey information, including recommendations, product dimensions, sales data, KPI data, and/or any other type of information about supply chain network 100 and the ongoing sales of products sold throughout supply chain network 100. In an embodiment, visualization engine 204 may process input transmitted by user action processor 202, and, in response to the input, may generate one or more subsequent graphical user input displays that allow one or more computers 150 to interact with the graphical user interface displays and to review different information displayed by visualization engine 204.

Aggregation engine 206 may aggregate product-store combinations according to selected metrics and may identify the strength of individual attributes, and save such product-store combinations in aggregated data 232. Aggregation engine 206 may also classify high-performing and low-performing product-store combinations within aggregated data 232 and save such classified data as classified data 236. Aggregation engine 206 may use classification thresholds data 234 in order to classify the product-store combinations.

Hindsight engine 208 may identify the strength of individual attributes within classified data 236 and save such attribute strength as individual attribute strength data 238. Hindsight engine 208 may also filter the attributes stored in individual attribute strength data 238 according to the identified strength of the individual attributes, and save the filtered attributes as filtered data 240. For example, hindsight engine 208 may filter all attributes falling below a particular threshold count, such as if a particular attribute is associated with only 1 product-store combination, though other filter thresholds may be used. Hindsight engine 208 may also estimate multi-combination strengths for attributes, as described in greater detail below, and save the multi-combination strengths for attributes as multi-attribute strength data 242.

Database 114 may comprise one or more databases 114 or other data storage arrangements at one or more locations, local to, or remote from, server 112. Database 114 comprises, for example, historical data 220, including but not limited to product placement data 222, product attributes data 224, product sales history data 226, and planogram dimension data 228; metrics data 230; aggregated data 232; classification thresholds data 234; classified data 236; individual attribute strength data 238; filtered data 240; and multi-attribute strength data 242. Although database 114 is illustrated and described as comprising historical data 220, product placement data 222, product attributes data 224, product sales history data 226, planogram dimension data 228, metrics data 230, aggregated data 232, classification thresholds data 234, classified data 236, individual attribute strength data 238, filtered data 240, and multi-attribute strength data 242, embodiments contemplate any suitable number or combination of these, located at one or more locations, local to, or remote from, assortment planner 110 according to particular needs.

Historical data 220 comprises, for example, any data relating to past sales, past demand, purchase data, promotions, events, or the like of one or more products and/or one or more supply chain entities 140. Historical data 220 may be stored at time intervals such as, for example, by the minute, hour, daily, weekly, monthly, quarterly, yearly, or any suitable time interval, including substantially in real time.

Product placement data 222 may comprise placement data and category data for each of the products stored in product attributes data 224. Product categories may organize products into any number of separate or overlapping categories with one or more placement constraints. By way of example only and not by way of limitation, product placement data 222 may comprise, for a series of drink products, alcoholic and non-alcoholic categories, beer, wine, and spirits categories, perishable and nonperishable categories, and/or any other categories applicable to the products, along with placement requirements for each of the categories of products. Although particular product placement data 222 and categories are described, embodiment contemplate any product placement data 222 and categories, according to particular needs.

Product attributes data 224 may comprise product identifiers, item identifiers, attribute data (including, for example, brands, dimensions, product images, three-dimensional product representations, and the like), inventory levels, and other like data about one or more products, product hierarchies, substitutable products, target service levels, and the like. Product attributes data 224 may comprise (X,Y) locations of each and every product in the planogram with reference to a left-bottom corner.

Product sales history data 226 comprises data relating to the sales effects each product may have when displayed next to other products on one or more shelves. Product sales history data 226 may comprise, for example, space elasticity data for a particular product and a particular retail location, and/or the increases or decreases a particular product may have on other products displayed next to the product on a retail shelf. According to embodiments, product sales history data 226 may comprise any one or more general cost or sales price components of one or more items in supply chain network 100, such as, for example, holding costs, batch costs, stockout costs, inventory costs, order costs, backorder costs, and backlog costs, and/or sale prices for one or more items. Although particular product sales history data 226 are described, embodiment contemplate any type of product sales history data 226, according to particular needs.

Planogram dimension data 228 may comprise data relating to one or more planograms. According to some embodiments, planograms comprise, among other data, three-dimensional capacity data of each shelf along with the fixture dimensions and cubic capacity of overall available space, and images of products arranged in a similar layout that the products will appear on the shelves of a retail store. According to other embodiments, planograms comprise one or more digital formats that represent products and product placement as sequences of data structures that may be more easily transmitted and modified by modules or components of one or more of assortment planner 110, one or more computers 150, and/or one or more retailers 148, businesses, or supply chain entities 140 in a supply chain network 100. Planogram dimension data 228 may comprise one or more existing and/or currently-active planograms that are in place at the one or more retail locations. In an embodiment, planogram dimension data 228 may include relevant key performance indicators (KPIs) and metrics by which assortment planner 110 measures the performance of one or more products and/or one or more categories that have been displayed at one or more retail locations according to one or more planograms.

Metrics data 230 may store data related to one or more metrics used to measure the performance of one or more products, stores, and/or attributes. Example metrics include revenue, profit, inventory turnover, or any other metric according to the preference of a supply chain planner or other user of assortment planner 110.

Aggregated data 232 stores data related to one or more aggregated product-store combinations. In embodiments, aggregated data 232 may be a set of product-store combinations associated with a metric as specified in metrics data 230. For example, if the metric selected is revenue, aggregated data 232 comprises a set of each product-store combination within the supply chain network, or a selected subset of the supply chain network, along with the revenue for each product-store combination over a particular time period, such as a previous year, a previous month or the like.

Classification thresholds data 234 may store data specifying the qualities, elements, or transition thresholds between classifications of products (including, but not limited to, classifying products as "high-performing" and "low-performing"). For example, one classification threshold may be 50%, that is, a top half of product-store combinations, according to the metric selected, will be classified as "high-performing" while the corresponding bottom half will be classified as "low-performing." Other classification thresholds, such as 80% (meaning only the top 20% is classified as high-performing) or 20% (meaning the top 80% is classified as high-performing) may be used according to particular needs or preferences.

Classified data 236 may store data related to classified product-store combinations. In embodiments, classified data 236 may contain the same product-store combinations as aggregated data 232, classified to specify which product-store combinations are high-performing and which product-store combinations are low-performing.

Individual attribute strength data 238 may store data related to quantifying or estimating the individual strength of one or more attributes. In embodiments, individual attribute strength data 238 comprises the estimated likelihood that a particular attribute results in a product-store combination being classified as high-performing. For example, for a set of apparel products, if 90% of products with a fabric color of red have been classified as high-performing, then the attribute "red" may have an individual attribute strength of 0.9. In other examples, attributes may instead be a class of like-attributes, such as "red shades," "basic colors," or "premium colors," rather than a particular individual attribute, according to particular needs and preference.

Filtered data 240 may store data relating to the attributes whose individual attribute strengths meet or exceed one or more specified thresholds, as described below. In embodiments, if a particular attribute is associated with too few product-store combinations, such an attribute may be filtered from individual attribute strength data 238. Such filtering action reduces the reliance on small sample sizes, and the potential for outlier or anomalous data to introduce noise into the assortment analysis.

Multi-attribute strength data 242 may store data related to the multi-combination strengths for potential combinations of attributes. In embodiments, hindsight engine 208 may use filtered data 240 to generate multi-attribute strengths by combining the filtered attribute strengths saved in filtered data 240. For example, if an attribute "red" has a individual attribute strength of 9, and a second attribute "short sleeve" has an individual attribute strength of 0.7, then hindsight engine 208 may determine that the multi-attribute "red and short sleeve" has a multi-attribute strength of 0.8, though the exact computation of multi-attribute strength may not be a mean or average calculation between individual attribute strengths.

In addition, or as an alternative, embodiments may use location data and location attributes to derive one or more insights, hindsights, and/or other recommendations/associations generated by assortment planner 110. For example, store type cold region and material cotton might have good strength, such that, the final analysis may also include location attributes along with product attributes to arrive at final insights, hindsights, and/or other recommendations.

Figure 3:
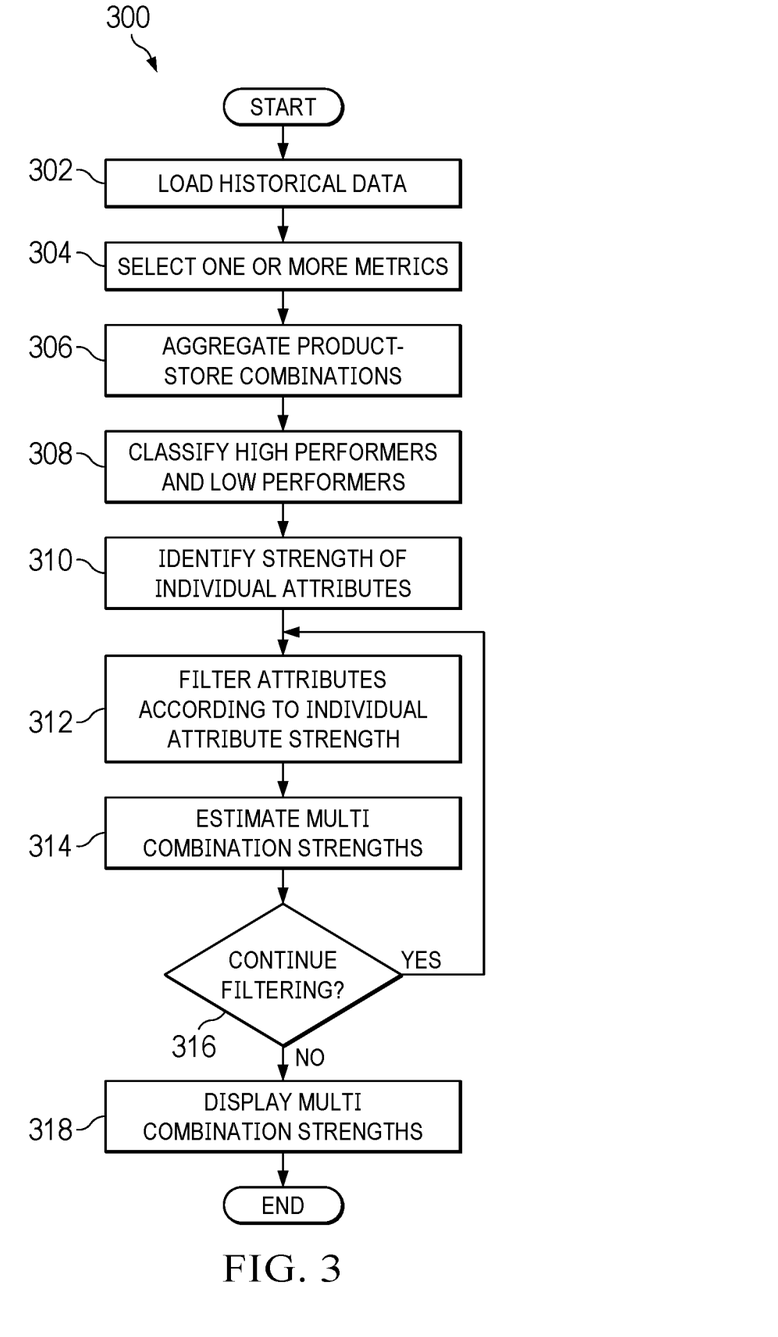
FIG. 3 illustrates an exemplary method of the assortment planner extracting hindsights from assortment planning data, according to an embodiment.

FIG. 3 illustrates an exemplary method 300 of assortment planner 110 extracting hindsights from assortment planning data, according to an embodiment. According to embodiments, method 300 of FIG. 3 may change filter attributes according to individual strength of the filter attributes based on the individual strength and/or the frequency of occurrence of the combination. The following method 300 proceeds by one or more activities, which although described in a particular order may be performed in one or more permutations, combinations, orders, or repetitions, according to particular needs.

At activity 302, assortment planner 110 loads historical data 220 into the input data of database 114. Aggregation engine 206 accesses historical data 220, which may include product placement data 222, product attributes data 224, product sales history data 226, and/or planogram dimension data 228, into the input data of database 114. At activity 304, user action processor 202 detects input to one or more input devices 152, and in response to the detected input, user action processor 202 selects one or more metrics with which to aggregate data and classify high-performing and low-performing products. According to embodiments, user action processor 202 may select product margin, product revenue, total profit, and/or any other metric or group of metrics. User action processor 202 stores the selected one or more metrics in metrics data 230 of database 114.

At activity 306, aggregation engine 206 aggregates product-store combinations according to the one or more selected metrics. Aggregation engine 206 accesses the input data and metrics data 230, and aggregates product-store combinations using the one or more selected metrics. By way of example only and not by way of limitation, in an embodiment in which user action processor 202 selected "margin" as the metric during activity 304 of method 300, aggregation engine 206 aggregates all products stored in the input data across all stores according to the "margin" key performance indicator (KPI). Aggregation engine 206 stores the aggregated products-store combinations in aggregated data 232.

At activity 308, aggregation engine 206 classifies high-performing and low-performing product-store combinations. Aggregation engine 206 accesses aggregated data 232 and identifies high-performing and low performing products according to classification thresholds stored in classification thresholds data 234. In an embodiment, aggregation engine 206 may classify all product-store combinations into a binary high-performing/low-performing classification (for example, in an embodiment, "Rockstar" and "Laggard"). In other embodiments, aggregation engine 206 may classify product-store combinations into three classifications (for example, "top performer," "average performer," and "problem performer"), or according to any other classification thresholds stored in classification thresholds data 234. Having classified the product-store combinations, aggregation engine 206 stores the classified product-store combinations in classified data 236.

At activity 310, aggregation engine 206 identifies individual attribute strength. Aggregation engine 206 accesses the classified product-store combinations in classified data 236. Aggregation engine 206 counts the number of times each attribute for each classified product-store combination appears in each classified category. For example, in an embodiment, the product-store combinations comprise four color attributes 404 (red, yellow, blue, and green) for three shirt style attributes (long-sleeved shirt, T-shirt, and tanktop shirt) sold at ten separate retailers 148 across the United States. In this example, aggregation engine 206 classifies each of the 120 product-store combinations (4 colors attributes×3 shirt style attributes×10 separate retailers 148) according to one of two classifications: Rockstar (indicating a product-store combination sells more units than the average) and Laggard (indicating a product-store combination sells less units than the average). Aggregation engine 206 counts the number of times each attribute (red, yellow, blue, green, etc.) is associated with a Rockstar product-store combination, and the number of times each attribute is associated with a Laggard product-store combination. Aggregation engine 206 stores the counted number of times each attribute is associated with each classification in individual attribute strength data 238. For example, in an embodiment, aggregation engine 206 counts that a particular red attribute appears in a Rockstar product-store combination 90% of the time and in a Laggard product-store combination 10% of the time, and stores an individual attribute strength of 0.9 for the red attribute in individual attribute strength data 238.

At activity 312, hindsight engine 208 filters the attributes according to frequency of the attribute combination that appears in the data. As an example only and not by way of limitation, and as shown in TABLE 1 red, sleeveless combination is not passed to next step, since frequency of the combination is less than threshold of 100. In this way, the insight derived from the data is only valid, if that combinations appears minimum number of times.

TABLE 1

| Combination | Probability | Frequency (threshold: 100) | Filtered and passed to next step |
|---|---|---|---|
| Red, cotton | 0.75 | 298 | Yes |
| Red, Sleeveless | 0.88 | 35 | No, since frequency is lower than threshold |
| Pink, full sleeve | 0.21 | 150 | Yes |

At activity 314, hindsight engine 208 estimates multi-combination strengths for attributes. Hindsight engine 208 accesses aggregated data 232, classified data 236, individual attribute strength data 238, and filtered data 240. Hindsight engine 208 uses the aggregated products-store combinations stored in aggregated data 232, the classified product-store combinations stored in classified data 236, and the counted number of times each attribute is associated with each classification in individual attribute strength data 238 to estimate multi-combination strengths for potential combinations of attributes, using only the attributes stored in filtered data 240 that met or exceeded the filtering threshold described above in association with activity 312.

Figure 5:
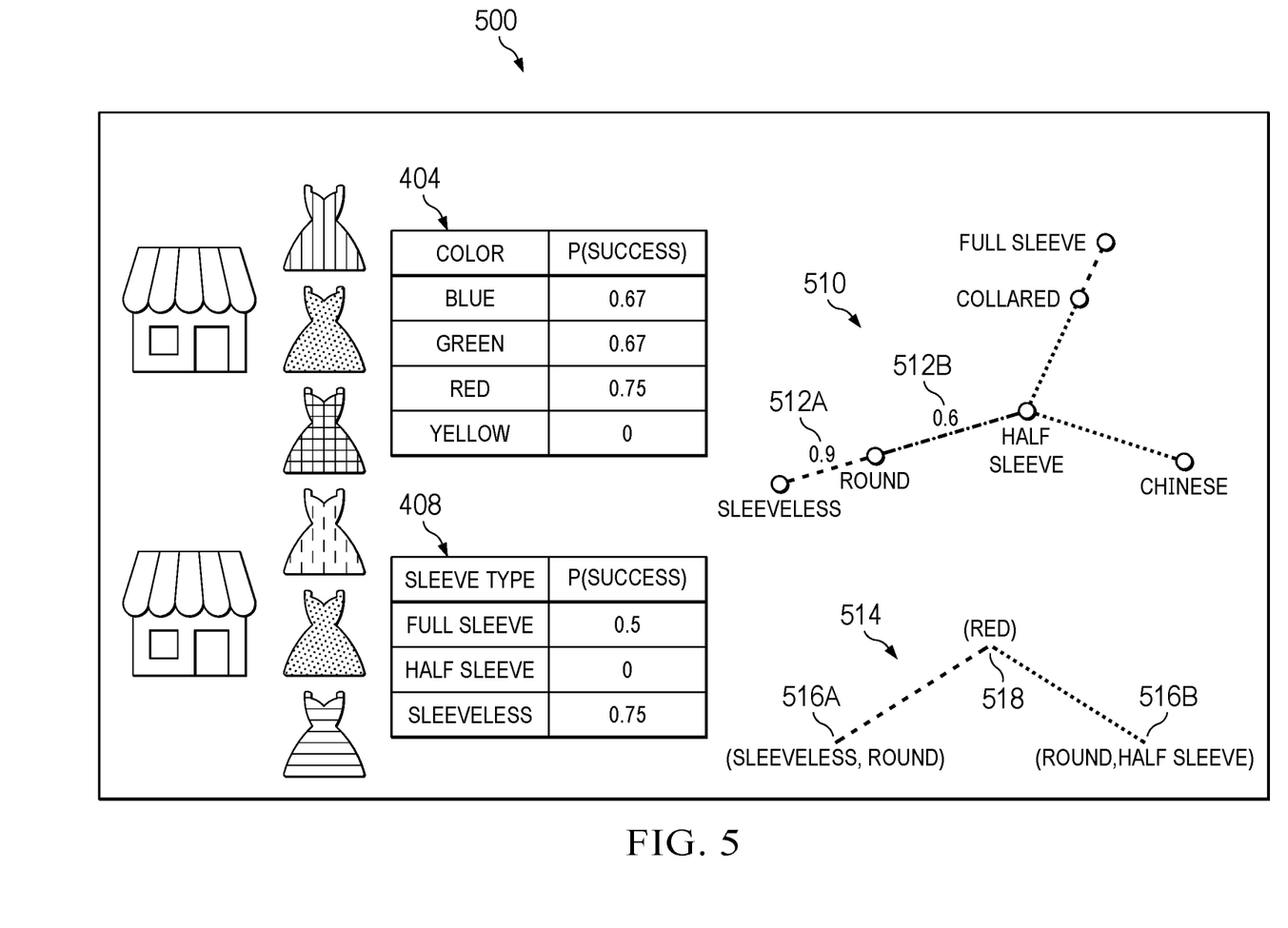
FIG. 5 illustrates a multi-attribute strength data graphical user interface display, according to an embodiment.

In an embodiment, hindsight engine 208 uses association rule mining to estimate multi-combination strengths for potential combinations of attributes. Hindsight engine 208 may use a multi-level attribute strength analysis during association rule mining to estimate multi-combination strengths for potential combinations of attributes. Hindsight engine 208 may construct a network of nodes and edges, an example of which is illustrated by FIG. 5, in which each node represents an attribute (such as, for example, "Sleeveless" or "Round") and edges connecting nodes represent probabilities that the strength of a particular attribute was classified as high-performing or low-performing. Hindsight engine 208 may traverse the network of nodes and edges to identify attribute combinations that satisfy the one or more metrics in combination (for example, in an embodiment, "Red" and "Sleeveless" together may be associated with high-performing product-store combinations 90% of the time, but "Red" as a single attribute may be associated with high-performing product-store combinations only 34% of the time, and "Sleeveless" only 15% of the time). Having estimated the multi-combination strengths for potential combinations of attributes, hindsight engine 208 may store the multi-combination strengths for potential combinations of attributes in multi-attribute strength data 242.

At activity 316, assortment planner 110 determines whether to return to activity 312, where hindsight engine 208 may further filter the remaining attributes according to one or more new specified thresholds, or to move to activity 318 of method 300, described below. In an embodiment, user action processor 202 may react to input to one or more input devices 152, directing assortment planner 110 to return to activity 312 and to specify, in response to input device 152 input, one or more new specified thresholds by which to narrow the attributes. In other embodiments, assortment planner 110 may repeatedly execute activity 312 and activity 314 of method 300, setting one or more new specified thresholds every time it executes activity 312, until assortment planner 110 has generated a specified number of estimated multi-combination strengths for attributes, or has generated a specified number of insights or has reached a specified termination criteria. If assortment planner 110 detects no instructions to return to activity 312, or if assortment planner 110 receives instructions to proceed to activity 318, assortment planner 110 continues to activity 318.

At activity 318, visualization engine 204 displays one or more multi-combination strengths for potential combinations of attributes using one or more GUI displays. Assortment planner 110 then terminates method 300.

To illustrate the activities of assortment planner 110 extracting hindsights from assortment planning data, the following example is provided. In this example, assortment planner 110 extract profitability insights and hindsights from a body of sales data related to dresses comprising a plurality of attributes (including color attributes 404 such as "red" and "green", shape attributes 406 such as "round" and "collared", and sleeve attributes 408 such as "sleeveless", "full sleeve" and "half sleeve") sold at several different retail stores. Although this example illustrates assortment planner 110 executing activities of method 300 in a particular order and configuration, embodiments contemplate assortment planner 110 performing the activities of method 300 in one or more permutations, combinations, orders, or repetitions, according to particular needs.

In this example, at activity 302, assortment planner 110 loads dresses historical data 220 into the input data of database 114. Aggregation engine 206 accesses historical data 220, which in this example includes product placement data 222, product attributes data 224, product sales history data 226, and/or planogram dimension data 228, into the input data of database 114. At activity 304, user action processor 202 detects input to one or more input devices 152, and in response to the detected input, user action processor 202 selects the "profitability" metric with which to aggregate data and classify high-performing and low-performing products. User action processor 202 stores the selected profitability metric in metrics data 230 of database 114.

Continuing the example, at activity 306, aggregation engine 206 aggregates dress product-store combinations according to the profitability metrics. Aggregation engine 206 accesses the input data and metrics data 230, and aggregates product-store combinations using the profitability metric. Aggregation engine 206 stores the aggregated products-store combinations in aggregated data 232.

Continuing the example, at activity 308, aggregation engine 206 classifies high-performing and low-performing product-store combinations for the sale of dresses at different stores according to the profitability metric. Aggregation engine 206 accesses aggregated data 232 and identifies high-performing and low performing products according to classification thresholds stored in classification thresholds data 234. In this example, aggregation engine 206 classifies all product-store combinations into a binary high-performing (1) or low-performing (0) classification. Having classified the product-store combinations, aggregation engine 206 stores the classified product-store combinations in classified data 236.

Continuing the example, at activity 310, aggregation engine 206 identifies individual attribute strengths. Aggregation engine 206 accesses the classified product-store combinations in classified data 236. Aggregation engine 206 counts the number of times each attribute for each classified product-store combination appears in each of the high-performing (1) and low-performing (0) categories. Aggregation engine 206 stores the counted number of times each attribute is associated with each classification in individual attribute strength data 238. Visualization engine 204 accesses individual attribute strength data 238 and generates individual attribute strength data GUI display 400, illustrated by FIG. 4.

Figure 4:
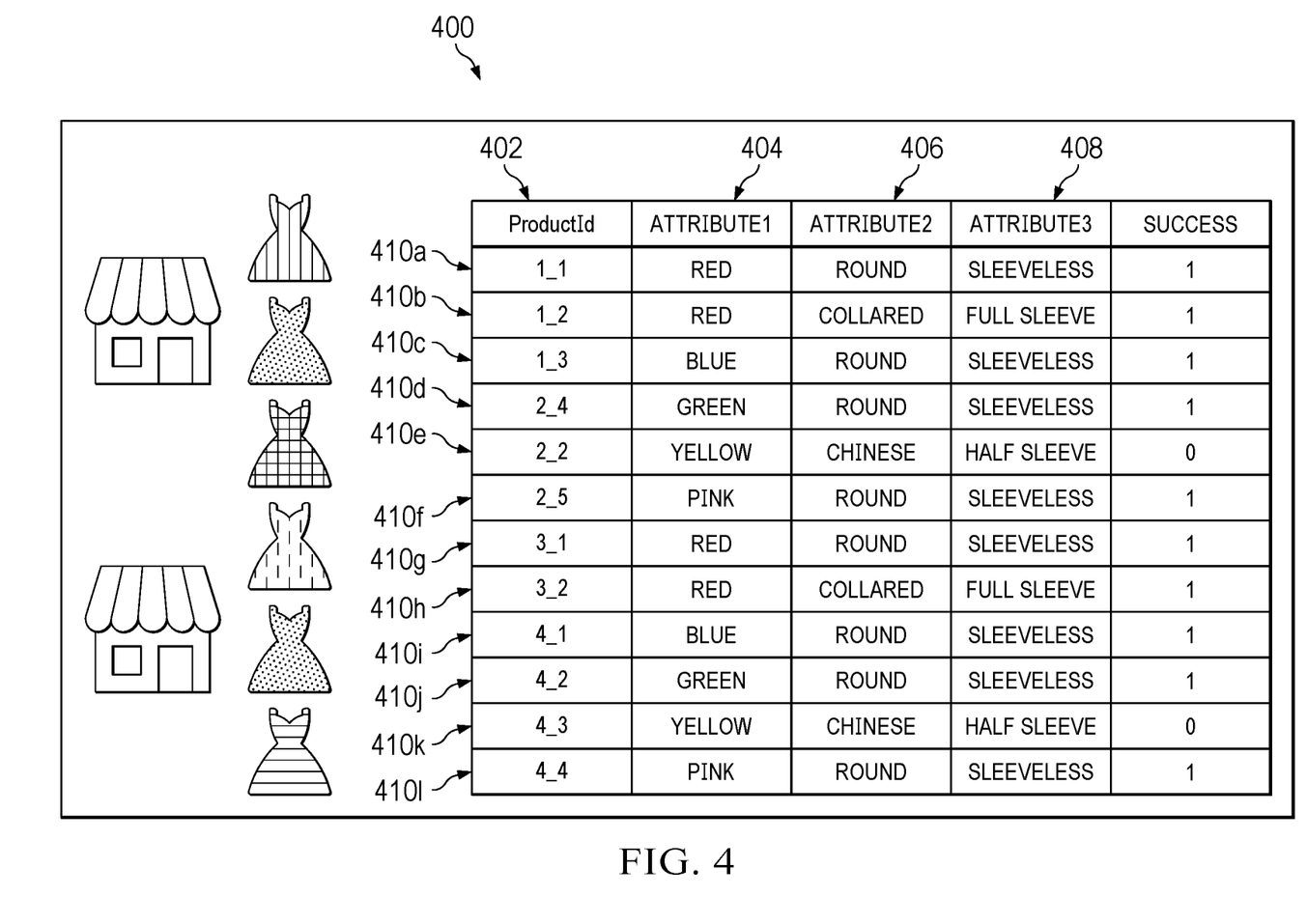
FIG. 4 illustrates an individual attribute strength data graphical user interface display, according to an embodiment.

FIG. 4 illustrates individual attribute strength data GUI display 400, according to an embodiment. In an embodiment, individual attribute strength data GUI display 400 may display products according to product ID 402 and associated attributes 404-408 (color attributes 404, shape attributes 406, sleeve attributes 408), as well as whether that particular product/attribute combination 410a-410l and/or product-store combination was classified as high-performing or low-performing. Although FIG. 4 illustrates individual attribute strength data GUI display 400 in a particular configuration, embodiments contemplate visualization engine 204 generating individual attribute strength data GUI displays 400 of any configuration and displaying any database data, according to particular needs.

Continuing the example, at activity 312, hindsight engine 208 filters the attributes according to individual attribute strength. Hindsight engine 208 accesses individual attribute strength data 238 and multi-attribute strength data 242, and filters all attributes that are have frequency below a specified threshold out of the hindsight extraction method. Hindsight engine 208 filters out all attributes with combination frequencies of 100 or lower as shown in Table 1. Hindsight engine 208 stores the attributes whose individual attribute combination frequencies are above the specified threshold in filtered data 240.

Continuing the example, at activity 314, hindsight engine 208 estimates multi-combination strengths for attributes. Hindsight engine 208 accesses aggregated data 232, classified data 236, individual attribute strength data 238, and filtered data 240. Hindsight engine 208 uses the aggregated products-store combinations stored in aggregated data 232, the classified product-store combinations stored in classified data 236, and the counted number of times each attribute is associated with each classification in individual attribute strength data 238 to estimate multi-combination strengths for potential combinations of attributes, using only the attributes stored in filtered data 240 that met or exceeded the filtering threshold described above in association with activity 312. In this example, hindsight engine 208 uses association rule mining to estimate multi-combination strengths for potential combinations of attributes. Hindsight engine 208 constructs a network of nodes and edges, and traverses the network of nodes and edges to identify attribute combinations that best satisfy the profitability metric. Having estimated the multi-combination strengths for potential combinations of attributes, hindsight engine 208 may store the multi-combination strengths for potential combinations of attributes in multi-attribute strength data 242. Visualization engine 204 accesses multi-attribute strength data 242 and generates multi-attribute strength data GUI display 500, illustrated by FIG. 5.

FIG. 5 illustrates multi-attribute strength data GUI display 500, according to an embodiment. In an embodiment, multi-attribute strength data GUI display 500 may display products according to product attributes and whether particular products and/or attributes are more likely or less likely to correspond to high-performing and low-performing product-store combinations. Multi-attribute strength data GUI display 500 comprises single attribute strength chart 510 and multi-attribute strength chart 514. Although FIG. 5 illustrates multi-attribute strength data GUI display 500 in a particular configuration, embodiments contemplate visualization engine 204 generating multi-attribute strength data GUI displays 500 of any configuration and displaying any database data, according to particular needs.

Single attribute strength chart 510 shows a set of single attribute nodes, each with an individual attribute strength, arranged in a graph. In this embodiment, single attribute strength chart 510 comprises the nodes "sleeveless," "round," "half sleeve," "collared," "full sleeve," and "Chinese." Single attribute strength chart 510 further comprises edges 512A and 512B. Edges 512A and 512B may be color-coded according to the strength of each edge 512. Edge 512A comprises a multi-attribute strength for the attributes "sleeveless" and "round," which in this example is 0.9. Edge 512B comprises a multi-attribute strength for the attributes "round" and "half sleeve," which in this example is 0.6.

Multi-attribute strength chart 514 shows a set of attribute nodes, arranged in a graph. In this embodiment, multi-attribute strength chart 510 comprises multi-attribute node 516A and 516B "sleeveless, round," and "round, half sleeve," as well as single attribute node 518 "red." Edges 512A and 512B of single attribute strength chart 510 are used as nodes in multi-attribute strength chart 514. Multi-attribute node 516A corresponds to edge 512A of single attribute strength chart 510, and multi-attribute node 516B corresponds to edge 512B of single attribute strength chart 510. In other embodiments, multi-attribute strength charts may be further condensed, using the edges of multi-attribute strength chart 514 to generate nodes for a second multi-attribute strength chart.

Continuing the example, at activity 316, assortment planner 110 determines whether to return to activity 312, where hindsight engine 208 may further filter the remaining attributes according to one or more new specified thresholds, or to move to activity 318 of method 300, described below. In this example, assortment planner 110 reacts to input to input device 152 instructing assortment planner 110 to proceed to activity 318.

Continuing the example, at activity 318, visualization engine 204 displays one or more multi-combination strengths for potential combinations of attributes using one or more GUI displays. In this example, visualization engine 204 generates strength, weakness, opportunity and threat (SWOT) analysis GUI display 600, illustrated by FIG. 6, and recommendation GUI display 700, illustrated by FIG. 7. Assortment planner 110 then terminates method 300.

Figure 6:
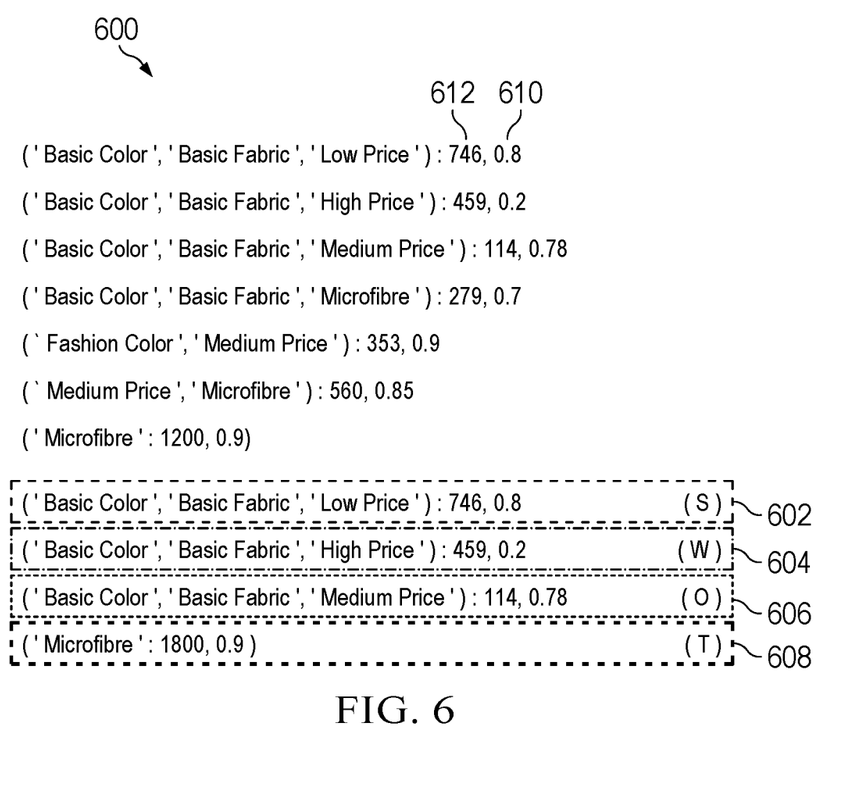
FIG. 6 illustrates a strength, weakness, opportunity and threat analysis graphical user interface display, according to an embodiment.

FIG. 6 illustrates SWOT analysis GUI display 600, according to an embodiment. In an embodiment, SWOT analysis GUI display 600 may display data stored in individual attribute strength data 238, filtered data 240, multi-attribute strength data 242, and/or other data related to one or more insights, hindsights, and/or other recommendations/associations generated by assortment planner 110. In an embodiment, assortment planner 110 may identify strengths 602, weaknesses 604, opportunities 606, and trends 608 using individual attribute strength data 238 (i.e., probabilities 610 and frequencies 612), filtered data 240, multi-attribute strength data 242, and/or other database data, and visualization engine 204 may display the strengths 602, weaknesses 604, opportunities 606, and trends 608 using one or more SWOT analysis GUI displays 600. Although FIG. 6 illustrates SWOT analysis GUI display 600 in a particular configuration, embodiments contemplate visualization engine 204 generating SWOT analysis GUI displays 600 of any configuration and displaying any database data, according to particular needs.

Figure 7:
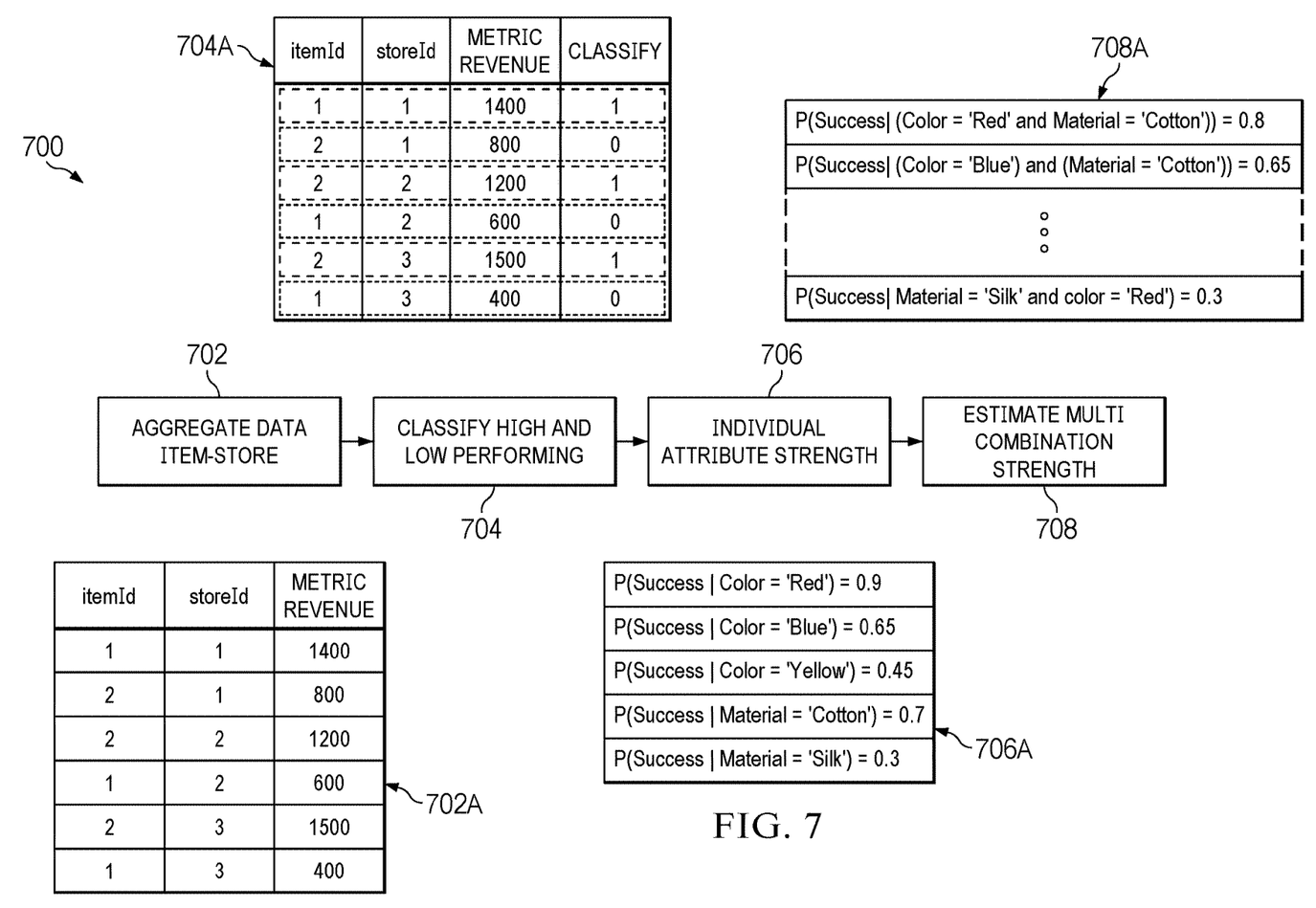
FIG. 7 illustrates a second method by which a hindsight engine may estimate the multi-combination strength of attributes, according to embodiments.
Figure 8:
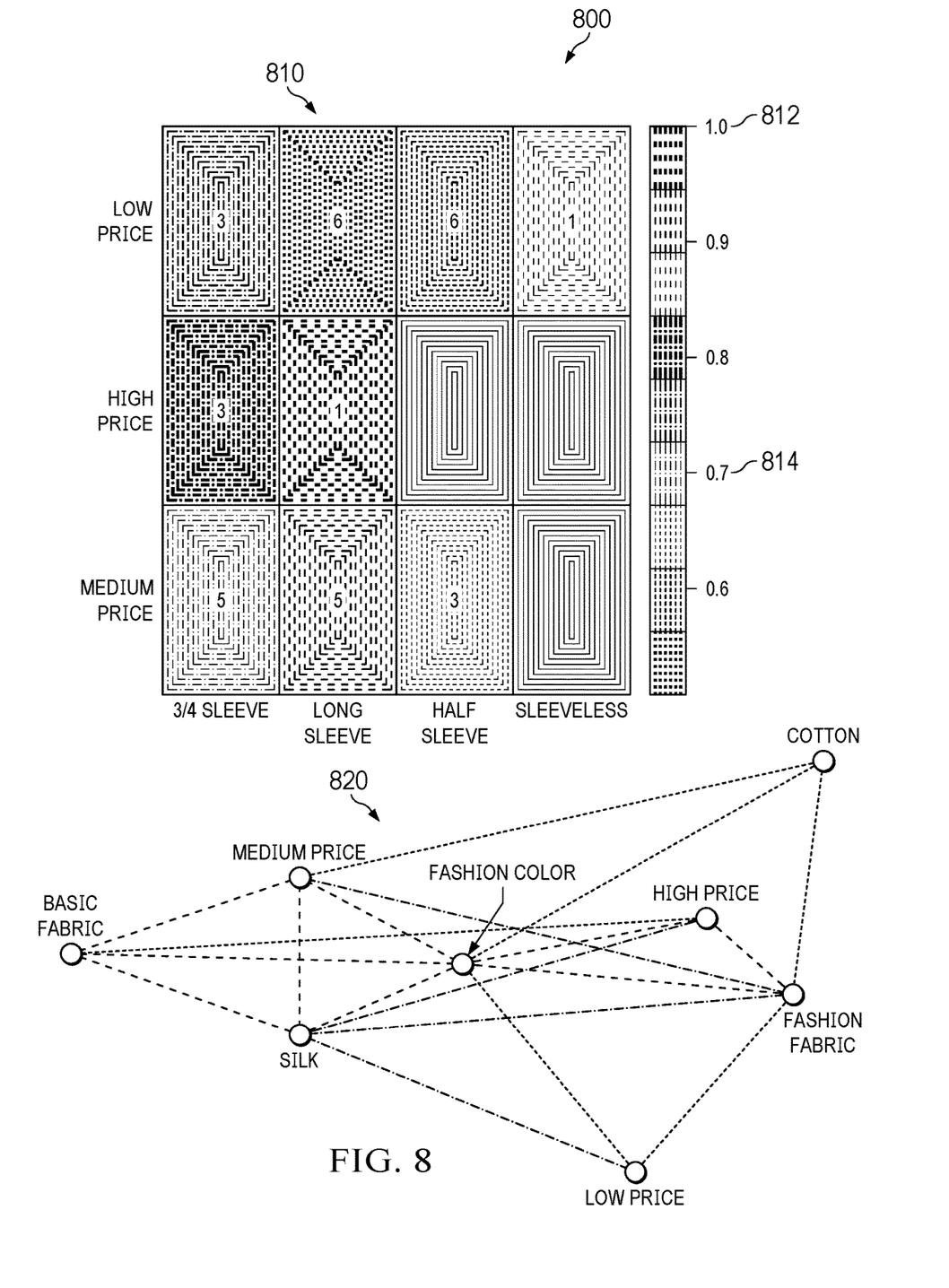
FIG. 8 illustrates an insight analysis graphical user interface display, according to an embodiment.

FIG. 7 illustrates second method 700 by which hindsight engine 208 may estimate the multi-combination strength of attributes, according to embodiments. Although FIG. 8 illustrates second method 700 in a particular configuration, embodiments contemplate assortment planner 110 executing activities in any order estimating the multi-combination strength of attributes in any configuration or permutation, according to particular needs.

In an embodiment, hindsight engine 208 aggregates item-store data at activity 702. The result of activity 702 is illustrated by aggregation chart 702A. Aggregation chart 702A shows an example with six product-store combinations, and the associated revenues of the six product-store combinations.

At second activity 704, hindsight engine 208 classifies high-performing and low-performing combinations. The result of activity 704 is illustrated by classification chart 704A, which separates the product-store combinations into high-performing and low-performing combinations according to the revenue of each product-store combination. In embodiments, the entries of classification chart 704A may be color coded, or otherwise marked, to indicate which combinations are high-performing and which combinations are low-performing, as also indicated by the "Classify" column of classification chart 704A.

At third activity 706, hindsight engine 208 derives attribute strengths from combinations. The results of activity 706 are illustrated by individual attribute chart 706A. Individual attribute chart 706A shows the probability of success (as defined by the likelihood of a particular attribute being associated with a high-performing combination, for 5 attributes.

At fourth activity 708, hindsight engine 208 estimates multi-combination strength. The results of activity 708 are illustrated in multi-attribute chart 708A. Multi-attribute chart 708A shows the probability of success for combinations of the attributes shown in single-attribute chart 706A. In this example, 3 multi-attributes are illustrated, when in fact according to all possible combinations of the 5 attributes shown in 706A would result in a larger number of multi-attributes.

FIG. 8 illustrates insight analysis GUI display 800, according to an embodiment. In an embodiment, visualization engine 204 may access data stored in database 114, including but not limited to historical data 220, aggregated data 232, classified data 236, individual attribute strength data 238, and multi-attribute strength data 242, and may generate one or more insight analysis GUI displays 800 to illustrate interactions among different attributes. Insight analysis GUI display 800 comprises insight chart 810 and insight graph 820. Although FIG. 8 illustrates insight analysis GUI display 800 in a particular configuration, embodiments contemplate visualization engine 204 generating insight analysis GUI displays 800 in any configuration, according to particular needs.

Insight chart 810 illustrates the relative attribute strengths of nine multi-attributes, which comprise the actual product-store combinations corresponding to three "price" attributes and four "sleeve type" attributes. According to embodiments, visualization engine 204 may color-code attribute interactions, such as, for example, by illustrating potentially profitable collection 812 of attributes with a green color, and illustrating less-profitable collections 814 of attributes using yellow, red, or other colors.

Insight graph 820 illustrates a graph network of eight single attribute nodes, along with the edges between those nodes. According to embodiments, visualization engine 204 may color-code the edges of insight graph 820, such as, for example, by illustrating edges with relatively high multi-attribute strengths with a green color, and illustrating edges with relatively low multi-attribute strengths with using yellow, red, or other colors.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A system, comprising:
a retail entity comprising a product display area offering one or more products for sale, each of the one or more products comprising a collection of product attributes; and
an assortment planner comprising a server and configured to:
classify each of the one or more products as high-performers or low-performers according to one or more selected metrics;
identify a strength of each individual product attribute associated with each of the one or more products;
filter each individual product attribute according to the identified strength;
derive a multi-combination strength of combinations of product attributes using the identified strength of each filtered individual product attribute;
generate recommendations for one or more product combinations based on the derived multi-combination strength of combinations of product attributes and the one or more selected metrics; and
control automated machinery to produce the one or more product combinations.

2. The system of claim 1, wherein the assortment planner is further configured to:
derive the multi-combination strength of combinations of product attributes using a two-level attribute strength graph comprised of nodes and edges.

3. The system of claim 2, wherein the assortment planner is further configured to:
express the edges of the two-level attribute strength graph as probabilities.

4. The system of claim 1, wherein the assortment planner is further configured to:
filter recommendations based on the identified strength of each individual product and location attribute associated with each of the one or more products.

5. The system of claim 1, wherein the assortment planner is further configured to:
derive the multi-combination strength of combinations of product attributes using association rule mining.

6. The system of claim 1, wherein the assortment planner is further configured to:
   filter product attributes that have a frequency below a specified threshold.

7. The system of claim 1, wherein the one or more selected metrics comprises one or more of:
   revenue, profit and inventory turnover.

8. A method, comprising:
   classifying, by an assortment planner comprising a server, each of one or more products in a product display area of a retail entity as high-performers or low-performers according to one or more selected metrics, the one or more products comprising a collection of product attributes;
   identifying, by the server, a strength of each individual product attribute associated with each of the one or more products;
   filtering, by the server, each individual product attribute according to the identified strength;
   deriving, by the server, a multi-combination strength of combinations of product attributes using the identified strength of each filtered individual product attribute;
   generating, by the server, recommendations for one or more product combinations based on the derived multi-combination strength of combinations of product attributes and the one or more selected metrics; and
   controlling, by the server, automated machinery to produce the one or more product combinations.

9. The method of claim 8, further comprising:
   deriving, by the server, the multi-combination strength of combinations of product attributes using a two-level attribute strength graph comprised of nodes and edges.

10. The method of claim 9, further comprising:
    expressing, by the server, the edges of the two-level attribute strength graph as probabilities.

11. The method of claim 9, further comprising:
    filtering, by the server, product attributes that have a frequency below a specified threshold.

12. The method of claim 8, further comprising:
    filtering, by the server, recommendations based on the identified strength of each individual product and location attribute associated with each of the one or more products.

13. The method of claim 8, further comprising:
    deriving, by the server, the multi-combination strength of combinations of product attributes using association rule mining.

14. The method of claim 8, wherein the one or more selected metrics comprises one or more of:
    revenue, profit and inventory turnover.

15. A non-transitory computer-readable medium comprising software, the software when executed configured to:
    classify each of one or more products in a product display area of a retail entity as high-performers or low-performers according to one or more selected metrics, the one or more products comprising a collection of product attributes;
    identify a strength of each individual product attribute associated with each of the one or more products;
    filter each individual product attribute according to the identified strength;
    derive a multi-combination strength of combinations of product attributes using the identified strength of each filtered individual product attribute;
    generate recommendations for one or more product combinations based on the derived multi-combination strength of combinations of product attributes and the one or more selected metrics; and
    control automated machinery to produce the one or more product combinations.

16. The non-transitory computer-readable medium of claim 15, where the software is further configured to:
    derive the multi-combination strength of combinations of product attributes using a two-level attribute strength graph comprised of nodes and edges.

17. The non-transitory computer-readable medium of claim 16, where the software is further configured to:
    express the edges of the two-level attribute strength graph as probabilities.

18. The non-transitory computer-readable medium of claim 16, where the software is further configured to:
    filter product attributes that have a frequency below a specified threshold.

19. The non-transitory computer-readable medium of claim 15, where the software is further configured to:
    filter recommendations based on the identified strength of each individual product and location attribute associated with each of the one or more products.

20. The non-transitory computer-readable medium of claim 15, where the software is further configured to:
    derive the multi-combination strength of combinations of product attributes using association rule mining.

* * * * *